(12) United States Patent
Nakamura et al.

(10) Patent No.: US 6,538,855 B1
(45) Date of Patent: Mar. 25, 2003

(54) MAGNETO-RESISTIVE THIN FILM MAGNETIC HEAD PREVENTING ENTRY OF UNNECESSARY MAGNETIC FLUX AND HAVING GOOD REPRODUCTION CHARACTERISTICS

(75) Inventors: Akira Nakamura, Atsugi (JP); Morio Kondo, Atsugi (JP); Norio Hasegawa, Atsugi (JP); Yasuhiko Shinjo, Atsugi (JP); Kenji Machida, Tokyo (JP); Naoto Hayashi, Tokyo (JP); Kazutoshi Mutou, Tokyo (JP); Toshihiro Uehara, Tokyo (JP); Junji Numazawa, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 219 days.

(21) Appl. No.: 09/717,668

(22) Filed: Nov. 21, 2000

(30) Foreign Application Priority Data

Nov. 24, 1999 (JP) .............................. 11-332989

(51) Int. Cl.$^7$ ................................................ G11B 5/39
(52) U.S. Cl. ...................................... 360/318; 360/321
(58) Field of Search ................................ 360/318, 321

(56) References Cited

U.S. PATENT DOCUMENTS

| | | | | |
|---|---|---|---|---|
| 5,258,883 A | * | 11/1993 | Ruigrok | 360/321 |
| 5,291,363 A | * | 3/1994 | Somers | 360/321 |
| 6,078,479 A | * | 6/2000 | Nepela | 360/318 |

* cited by examiner

Primary Examiner—A. J. Heinz
(74) Attorney, Agent, or Firm—Ladas & Parry

(57) ABSTRACT

A magneto-resistive thin film magnetic head is provided, which magnetic head includes: a base; a first yoke provided on the base and separated by a gap into first and second portions, the first portion including a side which opposes a magnetic recording medium; a magneto-resistive element which is magnetically coupled to the first and second portions of the first yoke and detects a magnetic recording signal; a second yoke formed on the first yoke so as to form a reproducing head gap between the first portion of the first yoke and the second yoke; and a third yoke provided between the first portion of the first yoke and the base so as to be magnetically coupled to the first portion of the first yoke. The reproducing head gap, the first portion of the first yoke, the magneto-resistive element, the second portion of the first yoke, ad the second yoke form a cut magnetic circuit.

24 Claims, 11 Drawing Sheets

MAGNETO-RESISTIVE THIN FILM MAGNETIC HEAD PREVENTING ENTRY OF UNNECESSARY MAGNETIC FLUX AND HAVING GOOD REPRODUCTION CHARACTERISTICS

BACKGROUND OF THE INVENTION

1. Field of the Invention

The present invention relates to magneto-resistive thin film magnetic heads, and more particularly to a magneto-resistive thin film magnetic head employing a magneto-resistive element (hereinafter referred to as an MR element) so as to read digital information recorded on a magnetic recording medium as a magnetic field strength signal from the magnetic recording medium.

2. Description of the Related Art

Conventionally, a magneto-resistive thin film magnetic head (hereinafter referred to as an MR head) which employs an MR element and yokes to lead magnetic flux from a magnetic recording medium to the MR element.

FIGS. 1 through 3 each show a conventional yoke-type MR head. In the following description, the left and right sides of the MR head shown in FIGS. 1 through 3 are defined as front and rear sides of the MR head, respectively. Ag shown therein, the yoke-type MR head includes a nonmagnetic substrate 2 on which a lower yoke 11, an upper yoke 12, an MR element 21, and nonmagnetic insulating layers 31 and 32 are provided. The lower yoke 11 includes a front portion 11a, a rear portion 11b, and a center portion 11c. The upper yoke 12 includes a front portion 12a and a rear portion 12b.

Each of the lower and upper yokes 11 and 12 is formed of a ferromagnetic material, and a gap 22 is formed between the front and rear portions 12a and 12b of the upper yoke 12. The upper yoke 12 is separated by the gap 22 into the front and rear portions 12a and 12b.

The MR element 21 is provided below the position where the gap 22 is formed in the upper yoke 12 so as to be magnetically coupled to the front and rear portions 12a and 12b of the upper yoke 12. The lower yoke 11 and the rear portion 12b of the upper yoke 12 are Joined to be magnetically coupled. A reproducing head gap 15 (minute gap) is formed between the lower yoke 11 and the front portion 12a of the upper yoke 12.

According to this structure, the front portion 12a of Me upper yoke 12, the MR element 21, the rear portion 12b of the upper yoke 12, and the lower yoke 11 form a magnetic circuit in the yoke-type MR head so that magnetic flux of a signal from a magnetic recording medium such as a magnetic tape, which flux is detected by the reproducing head gap 15, is converted into au electric signal by the MR element 21 so as to obtain a reproduced output (signal). The nonmagnetic insulating layers 31 and 32 ore formed between the lower and upper yokes 11 and 12.

FIG. 4 shows the waveform of a reproduced signal which is obtained when a reproduction process is performed, using the yoke-type MR head having the above-mentioned structure, on a magnetic tape 1 on which bits having an equal recording wavelength are recorded (namely a magnetic tape on which recorded is a signal which Is reversed magnetically at a predetermined period).

As described above, the signal, which is reversed magnetically at the predetermined period, is recorded on the magnetic tape 1. Therefore, if the reproduction process is well performed, a rectangular signal shown by a dot-dash line in FIG. 4 should be output. However, as shown in FIG. 4, the conventional MR head distorts the waveform of the reproduced signal (output).

FIG. 3 is a diagram for illustrating the reason for the generation of the distortion of the waveform of the reproduced signal. As shown therein, a plurality of bits $3_{n-1}$ through $3_{n+2}$... Having the equal recording wavelength are formed on the magnetic tape 1. Further, magnetic reversal regions $4_{n-1}$ through $4_{n+3}$... are formed on corresponding boundary portions each formed between each adjacent two of the bits $3_{n-1}$ through $3_{n+2}$... A recent trend toward a high-density magnetic recording requires a shorter recording wavelength. As a result, each of the bits $3_{n-1}$ through $3_{n+2}$... is also required to have a shorter length in the running directions (indicated by arrows $A_1$ and $A_2$ in FIG. 3) of the magnetic tape 1.

According to FIG. 3, the reproducing head gap 15 formed in the MR head opposes the bit $3_n$. Magnetic flux 5 from the magnetic reversal region $4_n$, as indicated by an arrow in FIG. 3, forms a magnetic path from the front portion 12a of the upper yoke 12 to the magnetic reversal region $4_{n+1}$ by way of the MR element 21, the rear portion 12b of the upper yoke 12, and the lower yoke 11.

When the magnetic flux 5 passes through the MR element 21, the MR element 21 varies an electrical resistance in accordance with a magnetic field applied thereto. Therefore, by causing a sense current to flow through the MR element 21 in advance, a variation in the electrical resistance can be obtained as a value of a voltage drop. The reproduced signal can be thus obtained.

According to FIG. 3, if the length of the recording wavelength is equal to or more than the thickness of the front portion 12a of the upper yoke 12, magnetic flux (hereinafter referred to as unnecessary magnetic flux) 6 from the magnetic reversal region 4, toward the magnetic reversal region $4_{n-1}$, which is in close proximity to the magnetic reversal region $4_n$, enters the MR element 21 through the front portion 12a of the upper yoke 12.

In other words, since a nonmagnetic coating layer of aluminum oxide ($Al_2O_3$) is provided on the front portion 12a of the upper yoke 12, the unnecessary magnetic flux 6 from the magnetic reversal region 4, goes to the front portion 12a of the upper yoke 12, which front portion has low magnetic reluctance. Although the direction of the unnecessary magnetic flux 6 is equal to that of the magnetic flux 5 from the proper magnetic reversal regions $4_n$ and $4_{n+1}$, the unnecessary magnetic flux 6 interferes with the magnetic flux 5, thus causing the distortion of the waveform of the reproduced signal shown in FIG. 4.

SUMMARY OF THE INVENTION

It IS a general object of the present invention to provide a magneto-resistive thin film magnetic head in which the above disadvantage is eliminated. A more specific object of the present invention is to provide a magneto-resistive thin film magnetic head which is allowed to have an excellent reproduction characteristic by preventing unnecessary magnetic flux from entering a yoke so as to preclude the waveform of a reproduced signal from being distorted.

The above objects of the present invention are achieved by a magneto-resistive thin film magnetic head including: a base; a first yoke provided on the base and separated by a gap into first and second portions, the first portion including a side which opposes a magnetic recording medium; a magneto-resistive element which is magnetically coupled to the first and second portions of the first yoke and detects a magnetic recording signal; a second yoke formed on the first yoke so as to form a reproducing head gap between the first portion of the first yoke and the second yoke; and a third yoke provided between the first portion of the first yoke and the bass so as to be magnetically coupled to the first portion of the first yoke, wherein the reproducing head gap, the first portion of the first yoke, the magneto-resistive element, the second portion of the first yoke, and the second yoke form a circular magnetic circuit.

According to the above-described magneto-resistive thin film magnetic head, the third yoke is provided between the first portion of the first yoke and the base so as to be magnetically coupled to the first portion of the first yoke. Therefore, even if a length of each bit recorded on the magnetic recording medium becomes shorter as a result of a high-density recording, magnetic flux (unnecessary magnetic flux) from a bit in a position separate from a bit opposing the reproducing head gap flows into the third yoke and Is prevented from flowing into the magneto-resistive element via the first yoke because of the existence of the third yoke in a position opposing the magnetic recording medium between the first portion of the first yoke and the base. Similarly, in the case of a bit having a longer length, the unnecessary magnetic flux can be prevented from flowing into the magneto-resistive element by providing the third yoke. The third yoke gives a more remarkable effect in the case of a longer bit.

Therefore, only magnetic flux (proper magnetic flux) from the bit opposing the reproducing head gap flows through the first yoke. Thus, the unnecessary magnetic flux does not interfere with the proper magnetic flux, so that an excellent reproduced signal can be obtained.

The above objects of the present invention are also achieved by a magneto-resistive thin film magnetic head including: a base; a first yoke provided on said base and separated by a gap into first and second portions, the first portion including a side which opposes a magnetic recording medium; a magneto-resistive element which is magnetically coupled to the first and second portions of the first yoke and detects a magnetic recording signal; a second yoke formed on the first yoke so as to form a reproducing head gap between the first portion of the first yoke and the second yoke; and a third yoke which is provided on the second yoke so as to be magnetically coupled thereto, wherein the reproducing head gap, the first portion of the first yoke, the magneto-resistive element, the second portion of the first yoke, and the second yoke form a circular magnetic circuit.

According to the above-described magneto-resistive thin film magnetic head, the third yoke is provided on the second yoke so as to be magnetically coupled thereto. Therefore, even if a length of each bit recorded on the magnetic recording medium becomes shorter as a result of a high-density recording, magnetic flux (unnecessary magnetic flux) from a bit in a position separate from a bit opposing the reproducing head gap flows into the third yoke and is prevented from flowing into the magneto-resistive element via the second yoke because of the existence or the third yoke in a position opposing the magnetic recording medium on the second yoke. Similarly, in the case of a bit having a longer length, the unnecessary magnetic flux can be prevented from flowing into the magneto-resistive element by providing the third yoke. The third yoke gives a more remarkable effect in the case of a longer bit.

Therefore, only magnetic flux (proper magnetic lux) from the bit opposing the reproducing head gap flows through the second yoke. Thus, the unnecessary magnetic lux does not interfere with the proper magnetic flux, so that an excellent reproduced signal can be obtained.

The above objects of the present invention are further achieved by a magneto-resistive thin film magnetic head including: a base; a first yoke provided on the base; a second yoke which is formed on the first yoke and separated by a gap into first and second portions so as to form a reproducing head gap between the first portion and the first yoke, the first portion including a side which opposes a magnetic recording medium; a magneto-resistive element which is magnetically coupled to the first and second portions of the second yoke and detects a magnetic recording signal; and a third yoke Which is provided on the first portion of the second yoke so as to be magnetically coupled thereto, wherein the reproducing head gap, the first portion of the second yoke, the magneto-resistive element, the second portion of the second yoke, and the first yoke form a circular magnetic circuit.

According to the above-described magneto-resistive thin film magnetic head, the third yoke is provided on the first portion of the second yoke so as to be magnetically coupled thereto. Therefore, even if a length of each bit recorded on the magnetic recording medium becomes shorter as a result of a high-density recording, magnetic flux (unnecessary magnetic flux) from a bit in a position separate from a bit opposing the reproducing head gap flows into the third yoke and is prevented from flowing into the magneto-resistive element via the second yoke because of the existence of the third yoke in a position opposing the magnetic recording medium on the first portion of the second yoke. Similarly, in the case of a bit having a longer length, the unnecessary magnetic flux can be prevented from flowing into the magneto-resistive element by providing the third yoke. The third yoke gives a more remarkable effect in the case of a longer bit.

Therefore, only magnetic flux (proper magnetic flux) from the bit opposing the reproducing head gap flows through the second yoke. Thus, the unnecessary magnetic flux does not interfere with the proper magnetic flux, so that an excellent reproduced signal can be obtained.

BRIEF DESCRIPTION OF THE DRAWINGS

Other objects, features and advantages of the present invention will become more apparent from the following detailed description when read in conjunction with the accompanying drawings, in Which.

DETAILED DESCRIPTION OF THE PREFERRED EMBODIMENTS

Next, a description will be given, with reference to the accompanying drawings, of embodiments of the present invention.

Figure 5:
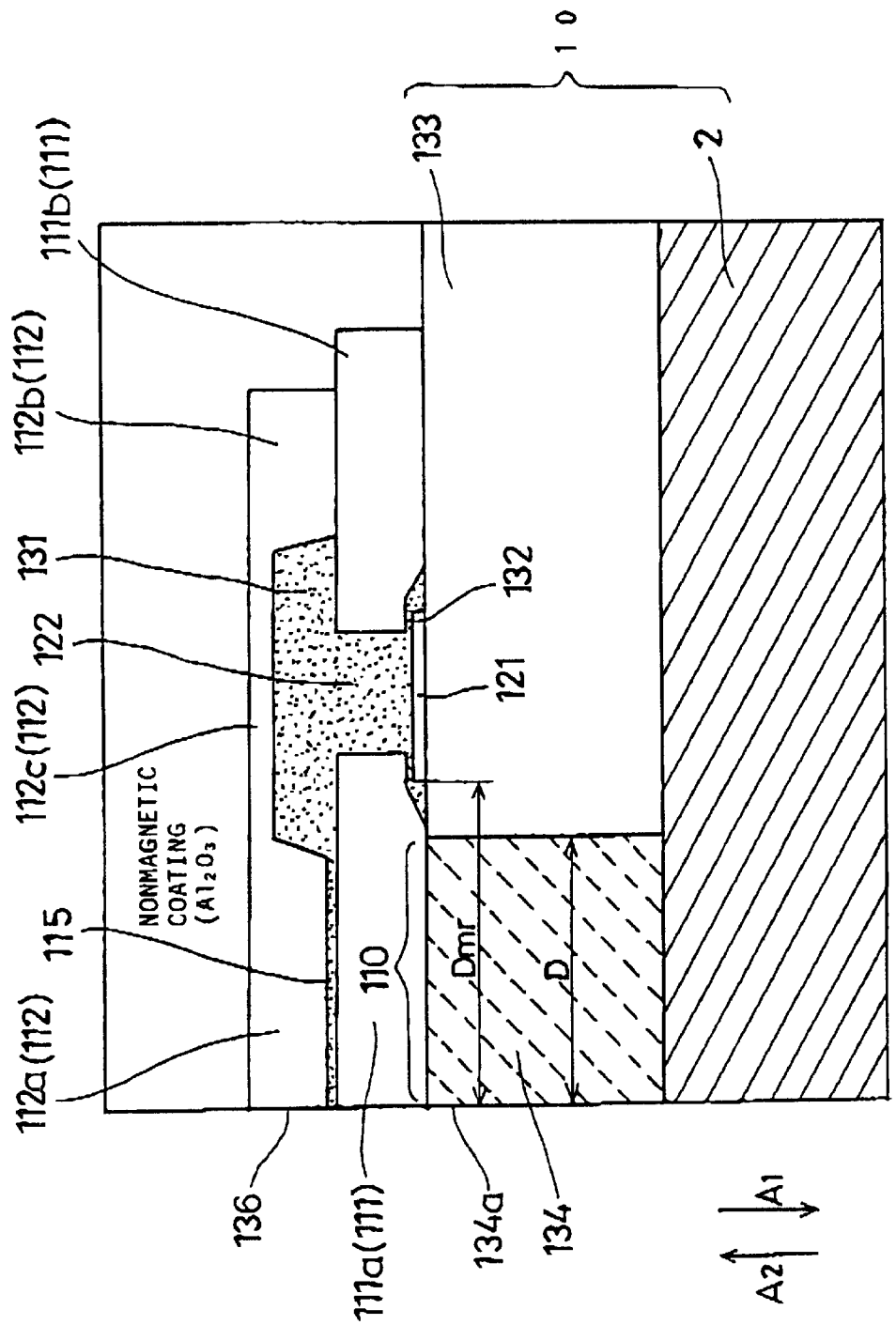
FIG. 5 is a sectional view of a magneto-resistive thin film magnetic head according to a first embodiment of the present invention.
Figure 6:
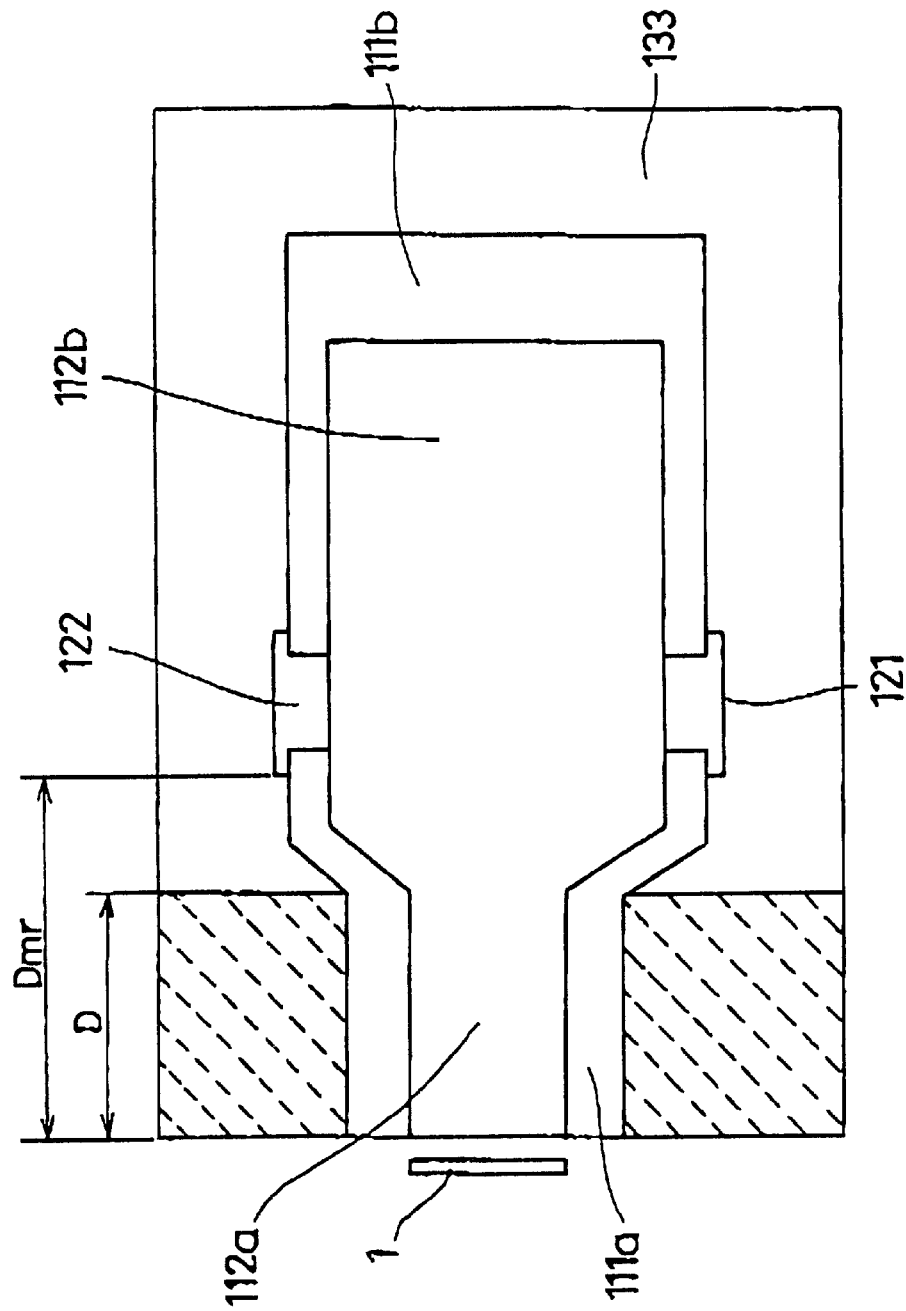
FIG. 6 is a plan view of the magneto-resistive thin film magnetic head of FIG. 5.
Figure 7:
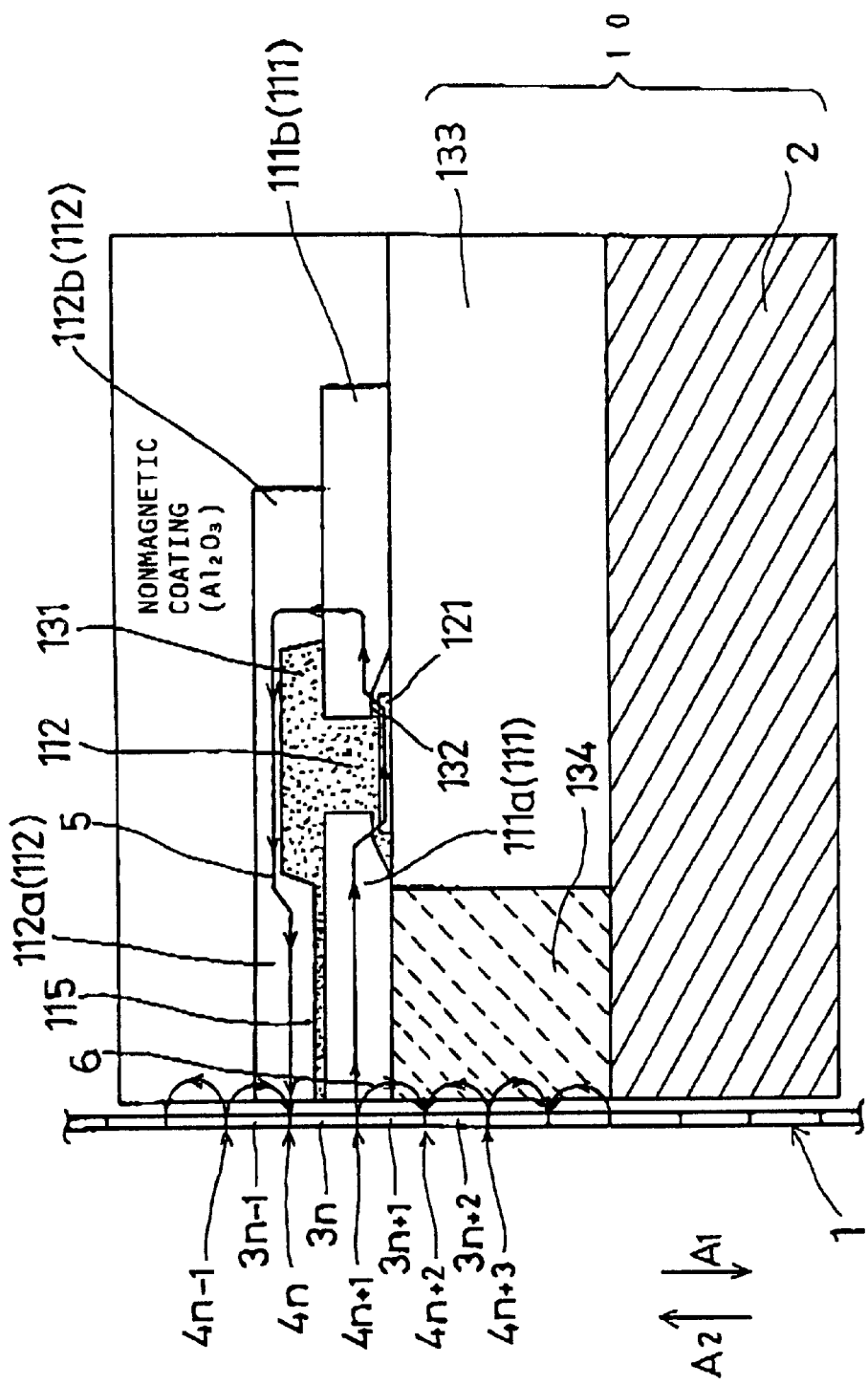
FIG. 7 is a diagram for illustrating a function of the magneto-resistive thin film magnetic head of FIG. 5.

FIGS. 5 and 6 each show a magneto-resistive thin film head according to a first embodiment of the present invention. FIG. 5 is a sectional view and FIG. 6 is a plan view of the magneto-resistive thin film head. In the following description, directions indicated by arrows $A_1$ and $A_2$ in FIG. 5 are defined as upward and downward directions, respectively, and the left and right sides of the MR head in FIGS. 5 through 7 are defined as front and rear sides of the magneto-resistive thin film head, respectively.

As shown in each of FIGS. 5 and 6, the magneto-resistive thin film head (hereinafter referred to as an MR head) includes a magnetic or nonmagnetic substrate 2 on which a lower yoke 111, an upper yoke 112, a magneto-resistive element (hereinafter referred to as an MR element) 121, nonmagnetic insulating layers 131 and 132, a nonmagnetic insulating member 133, and a lower auxiliary yoke 134 are provided. The substrate 2 and the nonmagnetic insulating member 133 form a base 10. According to this embodiment, a ferrite substrate is employed as the substrate 2. The vertical length of the lower auxiliary yoke 134 in the sliding (running) directions of the magnetic tape 1 is determined so as to be equal to or more than double the length of the recording wavelength. Further, if a magnetic substrate is employed as the substrate 2, the sum of the thickness of a front portion 111a of the lower yoke 111, the vertical length of the lower auxiliary yoke 134, and the vertical length of the substrate 2 is determined 80 as to be equal to or more than double the length of the recording waveform. It is preferable if the sum is equal to or more than quadruple the length of the recording waveform.

The lower yoke 111 includes the front portion 111a and a rear portion 111b. The upper yoke 112 includes a front portion 112a, a rear portion 112b, and a center portion 112c.

Each of the lower and upper yokes 111 and 112 is formed of a ferromagnetic material (cobalt-zirconium (Co—Zr) based material in this embodiment), and a gap 122 is formed between the front and rear portions 111a and 111b of the lower yoke 111. The lower yoke 111 is separated by the gap 22 into the front and rear portions 111a and 111b.

The MR element 121 is provided on the upper surface of the nonmagnetic Insulating member 133 below the position where the gap 122 is formed. In other words, the MR element 121 is interposed between the upper surface of the nonmagnetic insulating member 133 and the lower surface of the lower yoke 111, and the gap 122 is formed above the MR element 121.

The nonmagnetic insulating member 133, which is made of, for example, nonmagnetic ceramics, includes an upper surface which is subjected to a polishing process to have low profile irregularity. The MR element is provided on this upper surface. Therefore, the characteristic of the MR element 121 can be improved by providing the MR element on the upper surface of the nonmagnetic insulating member 133, that is, by providing the MR element 121 below the lower yoke 111.

Figure 1:
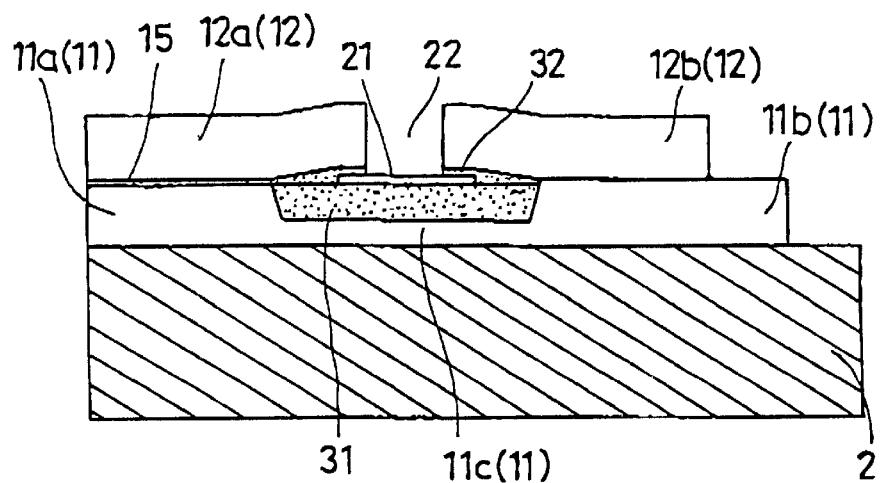
FIG. 1 is a sectional view of a conventional magneto-resistive thin film magnetic head.
Figure 2:
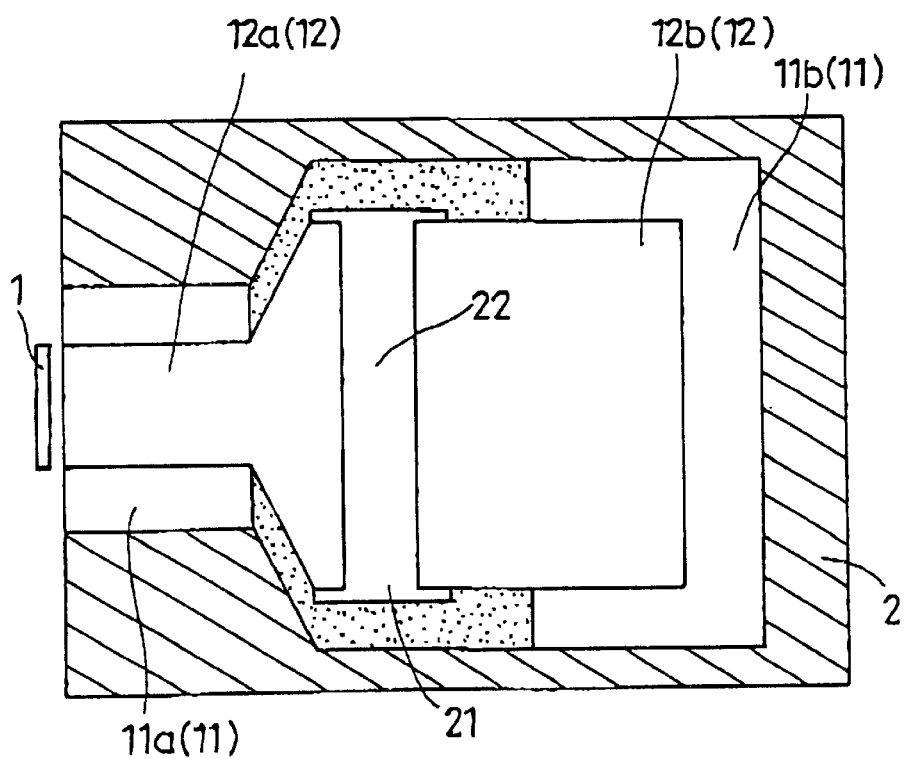
FIG. 2 is a plan view of the conventional magneto-resistive thin film magnetic head of FIG. 1.

In other words, the MR element 121 cannot be formed uniformly on a rough surface. For example, according to the conventional MR head shown in FIGS. 1 and 2, the MR element 21 is formed on the nonmagnetic insulating layer 31, which is usually made of $Al_2O_3$. However, since it is difficult to lower profile irregularity of the upper surface of the nonmagnetic insulating layer 31, the MR element cannot be uniformly formed thereon. When the MR element 21 is thus non-uniformly formed, variations in magnetic reluctance caused by the application of magnetic field become non-uniform, thus preventing a high-accuracy reproduction process from being performed.

However, by providing the MR element 121 below the front and rear portions 111a and 111b of the lower yoke 111 as in this embodiment, the MR 121 can be formed on the upper surface of the nonmagnetic insulating member 133, which surface has low profile irregularity, and the variations in the magnetic reluctance caused by the application of magnetic field become uniform. Thus, the MR element 121 can generate an excellent reproduced signal in a reproduction process.

According to the conventional MR head, when the nonmagnetic insulating layer 31 made of $Al_2O_3$ is polished, together with the front and rear portions 11a and 11b of the lower yoke 11, which portions each include a functional thin film, so as to lower profile irregularity of the upper surface thereof, each of the front and rear portions 11a and 11b may suffer from deterioration of a characteristic as a functional thin film as a result of the polishing. Further, since it is difficult to uniformly polish the substrate 2, the film thickness control of the lower yoke 11, which has a thickness of a few microns, entails difficulty.

On the other hand, according to this embodiment, there are advantages that the MR element 121 can be formed directly on the upper surface of the nonmagnetic insulating member 133, which surface has low profile irregularity, and that the front and rear portions 111a and 111b of the lower yoke 111 can be formed without machining. Further, the production process of the MR head can be simplified without the polishing process.

The above-described MR element 121 is provided so as to be magnetically coupled to the front and rear portions 111a and 111b of the lower yoke 111. The rear portion 112b of the upper yoke 112 and the rear portion 111b of the lower yoke 111 are joined to be magnetically coupled. A reproducing head gap 115 is formed between the front portion 111a of the lower yoke 111 and the front portion 112a of the upper yoke 112.

According to this structure, the front portion 111a of the lower yoke 111, the MR element 121, the rear portion 111b of the lower yoke 111, and the upper yoke 112 (namely, the front, rear, and center portions 112a, 112b, and 112c thereof)

form a magnetic circuit in the yoke-type MR head according to this embodiment so that magnetic flux of a signal from the magnetic tape 1, which flux is detected by the reproducing head gap 115, is converted into an electric signal by the MR element 121 so as to obtain a reproduced signal. The nonmagnetic insulating layer 131 is formed between the lower and upper yokes 111 and 112, and the nonmagnetic insulating layer 132 is formed between the lower yoke 111 and the nonmagnetic insulating member 133 so as to cover the MR element 121.

Next, a description will be given of the lower auxiliary yoke 134, which is a principal part of the present invention.

Like the lower and upper yokes 111 and 112, the lower auxiliary yoke 134 is formed of a ferromagnetic material (Co—Zr based material). The lower auxiliary yoke 134 is provided between the front portion 111a and the substrate 2 so that the upper surface of the lower auxiliary yoke 134 is magnetically coupled to the front portion 111a of the lower yoke 111.

In other words, the lower auxiliary yoke 134 and the front portion 11a of the lower yoke 111 are magnetically coupled in a region indicated by the numeral 110 in FIG. 5. The lower auxiliary yoke 134 and the front portion 111a of the lower yoke 111 can be magnetically coupled by a variety of methods. For example, one of such methods is sputtering, by which thin films are deposited to form the front portion 111a of the lower yoke 111 on the lower auxiliary yoke 134.

A side 134a of the lower auxiliary yoke 134 and a contact surface 136, which is formed by the front portion 111a of the lower yoke 111 and the front portion 112a of the upper yoke 112, form a single flat surface. Therefore, the side 134a of the lower auxiliary yoke 134 opposes the magnetic tape 1 running during the playback thereof. Thereby, magnetic flux (leakage magnetic flux) of a signal from the magnetic tape 1 also flows into the lower auxiliary yoke 134.

Concerning the shape of the lower auxiliary yoke 134, according to this embodiment, the depth (horizontal dimension in FIG. 5) D of the lower auxiliary yoke 134 is determined so as to satisfy a condition D<Dmr, where Dmr is a distance from the side 134a of the lower auxiliary yoke 134 to one end side of the MR element 121 on the side of the front portion 111a of the lower yoke 111. According to this structure, the lower auxiliary yoke 134 is prevented from opposing and being magnetically coupled to the rear portion 111b of the lower yoke 111 and the MR element 121.

If the lower auxiliary yoke 134 did oppose the rear portion 111b of the lower yoke 111, the rear portion 112b of the upper yoke 112 would be magnetically coupled to the lower auxiliary yoke 134 via the rear portion 111b of the lower yoke 111, thus forming a magnetic circuit. In this case, however, the magnetic flux from the magnetic tape 1 bypasses the MR element 121 and passes through the lower auxiliary yoke 134. That is, the magnetic flux does not pass through the MR element 121.

Further, if the lower auxiliary yoke 134 opposed the MR element 121, the magnetic flux would enter the rear portion 112b of the upper yoke 112, the rear portion 111b of the lower yoke 111, and further, the MR element 121. However, the magnetic flux would not go to the front portion 111a of the lower yoke 111, to which the magnetic flux should properly go, but instead, would enter the lower auxiliary yoke 134. Therefore, a proper magnetic circuit would not be foamed. Thus, a proper reproduced signal could not be obtained with the lower auxiliary yoke 134 opposing the rear portion 111b of the lower yoke 111 and/or the MR element 121.

However, by determining the depth D of the lower auxiliary yoke 134 so that the depth D satisfies the condition D<Dmr, the lower auxiliary yoke 134 is prevented from opposing the rear portion 111b of the lower yoke 111 and/or the MR element 121 and the magnetic flux from the magnetic tape 1 always passes through the MR element 121. Therefore, the proper reproduced signal can reliably be obtained.

As described above, by providing the lower auxiliary yoke 134 between the front portion 111a of the lower yoke 111 and the substrate 2 so that the lower auxiliary yoke 134 is magnetically coupled to the front portion 111a of the lower yoke 111, the reproduced signal is prevented from having distortion of the waveform thereof.

A description will now be given of the reason for this with reference to FIG. 7. In FIG. 7, the same elements as those of FIG. 3 will be referred to by the same numerals so that a comparison between FIGS. 3 and 7 can be made with ease.

As shown in FIG. 7, the bits $3_{n-1}$ through $3_{n+2}$ ... having the equal recording wavelength are formed on the magnetic tape 1. Further, the magnetic reversal regions $4_{n-1}$ through $4_{n+}$ ... are formed on the corresponding boundary portions each formed between each adjacent two of the bits $3_{n-1}$ through $3_{n+2}$ ... The recent trend toward a high-density magnetic recording requires a shorter recording wavelength. As a result, each of the bits $3_{n-1}$ through $3_{n+2}$ ... is also required to have a shorter length in the running directions (indicated by arrows $A_1$ and $A_2$ in FIG. 7) of the magnetic tape 1. The above points are equal to those described previously with reference to FIG. 3.

Also according to this embodiment shown in FIG. 7, the reproducing head gap 115 formed in the MR head opposes the bit $3_n$. Therefore, the magnetic flux (proper magnetic flux) 5 from the magnetic reversal region $4_{n+1}$, as indicated by an arrow in FIG. 7, forms a magnetic path from the front portion 111a of the lower yoke 111 to the magnetic reversal region $4_n$ by way of the MR element 121, the rear portion 111b of the lower yoke 111, and the upper yoke 112. The reproduced signal can be obtained by the proper magnetic flux 5 passing through the MR element 121.

Now, the unnecessary magnetic flux 6, which is generated from the magnetic reversal region $4_n$ to enter the conventional MR head (see FIG. 3), is brought into focus.

Figure 3:
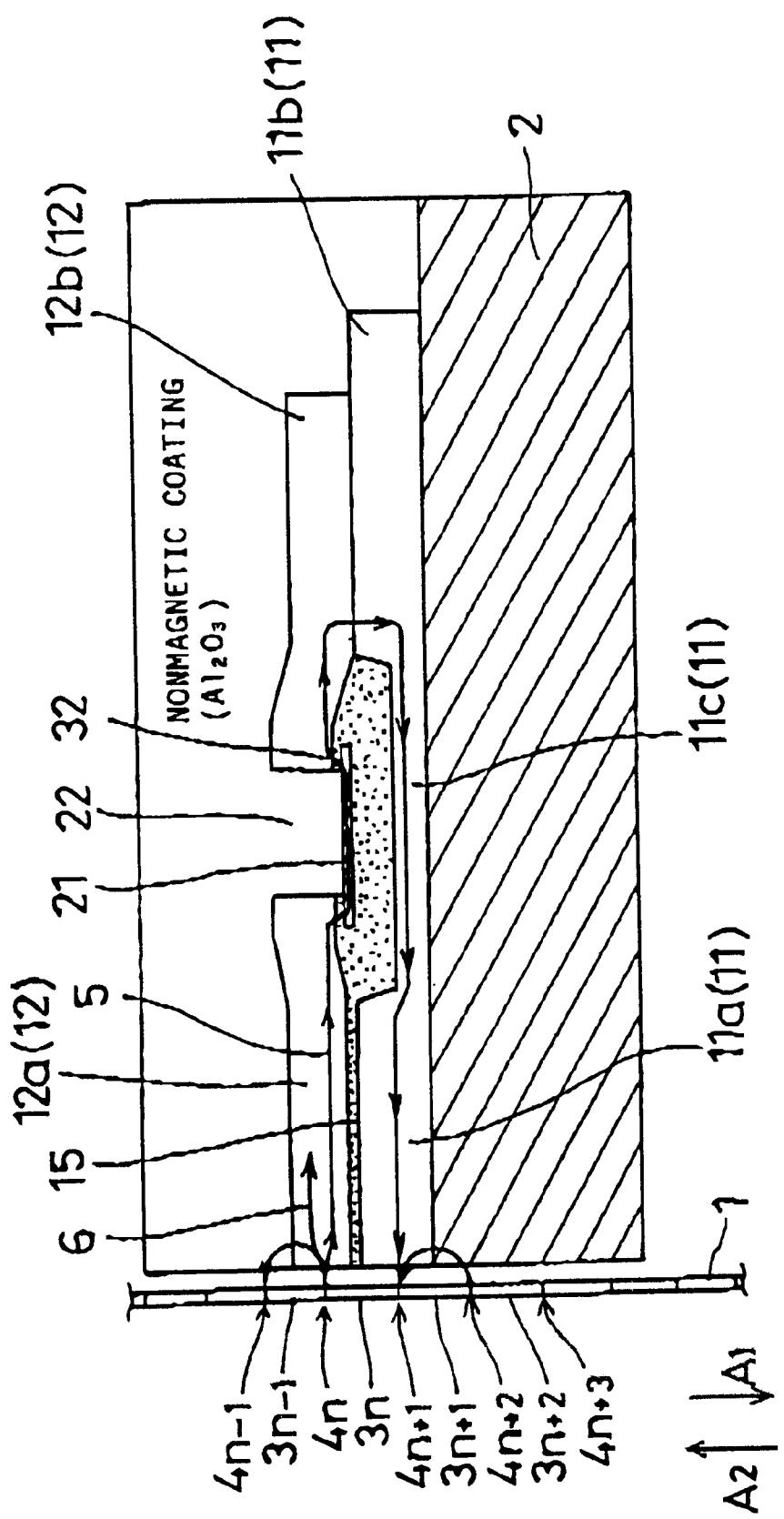
FIG. 3 is a digram for illustrating a function of the conventional magneto-resistive thin film magnetic head of FIG. 1.
Figure 4:
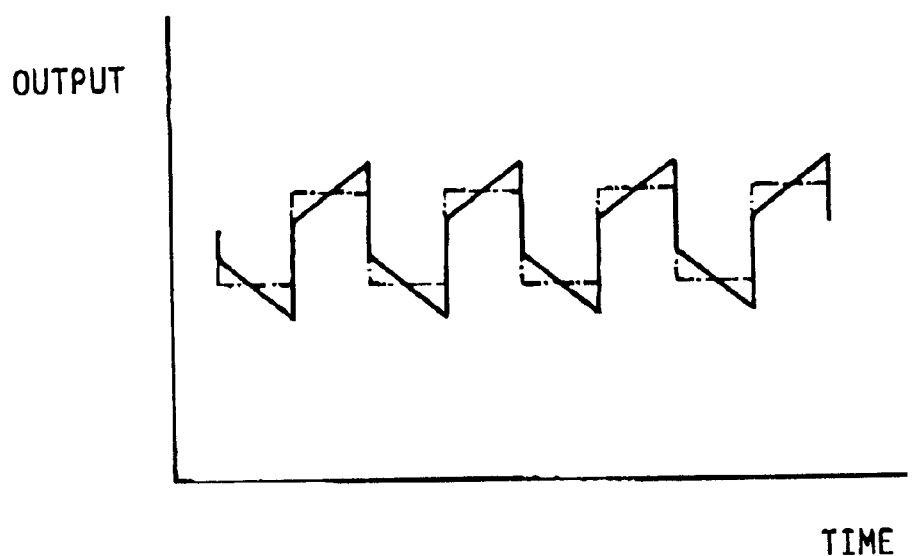
FIG. 4 is a graph showing a reproduced output of the conventional magneto-resistive thin film magnetic head of FIG. 1.

According to the conventional MR head shown in FIG. 3, since the nonmagnetic material of $Al_2O_3$ having high magnetic reluctance is provided on the front portion 12a of the upper yoke 12, the unnecessary magnetic flux 6 does not flow to the magnetic reversal region $4_{n-1}$. Instead, the unnecessary magnetic flux 6 flows to the front portion 12a of the upper yoke 12, which portion has low magnetic reluctance, and further to the MR element 21, thus causing the distortion of the waveform of the reproduced signal.

On the other hand, the MR head according to this embodiment, which is provided with the lower auxiliary yoke 134, has a structure shown in FIG. 7. According to this structure, since the magnetic reversal region $4_{n+}$opposes the front portion 111a of the lower yoke 111, which portion is magnetically coupled to the lower auxiliary yoke 134, the unnecessary magnetic flux 6 from the magnetic reversal region $4_{n+1}$ flows into the magnetic reversal region $4_{n+2}$ via the lower auxiliary yoke 134 without interfering with the proper magnetic flux 5. Therefore, the unnecessary magnetic flux 6 does not flow into the MR element 121 via the front portion 111a of the lower yoke 111.

Thus, the unnecessary magnetic flux 6 does not interfere with the proper magnetic flux 5 in the magnetic circuit formed in the MR head, preventing the waveform of the reproduced signal from being distorted.

Figure 8:
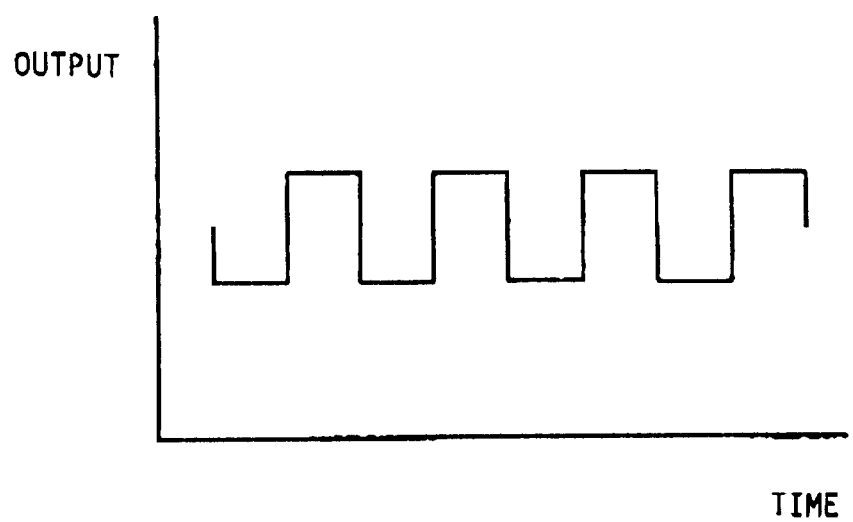
FIG. 8 is a graph showing a reproduced output of the magneto-resistive thin film magnetic head of FIG. 5.

FIG. 8 shows the waveform of a reproduced signal which is obtained when the reproduction process is performed, using the yoke-type MR head according to this embodiment, on the magnetic tape 1 on which the bits having the equal recording wavelength are recorded (namely, the magnetic tape on which is recorded the signal which is reversed magnetically at the predetermined period). As shown in FIG. 8, the reproduced signal has a rectangular waveform without distortion, which demonstrates that the waveform of the reproduced signal is prevented from being distorted by providing the lower auxiliary yoke 134 as in this embodiment.

Next, a description will be given, with reference to FIG. 9, of a second embodiment of the present invention. The second embodiment is a variation of the first embodiment.

Figure 9:
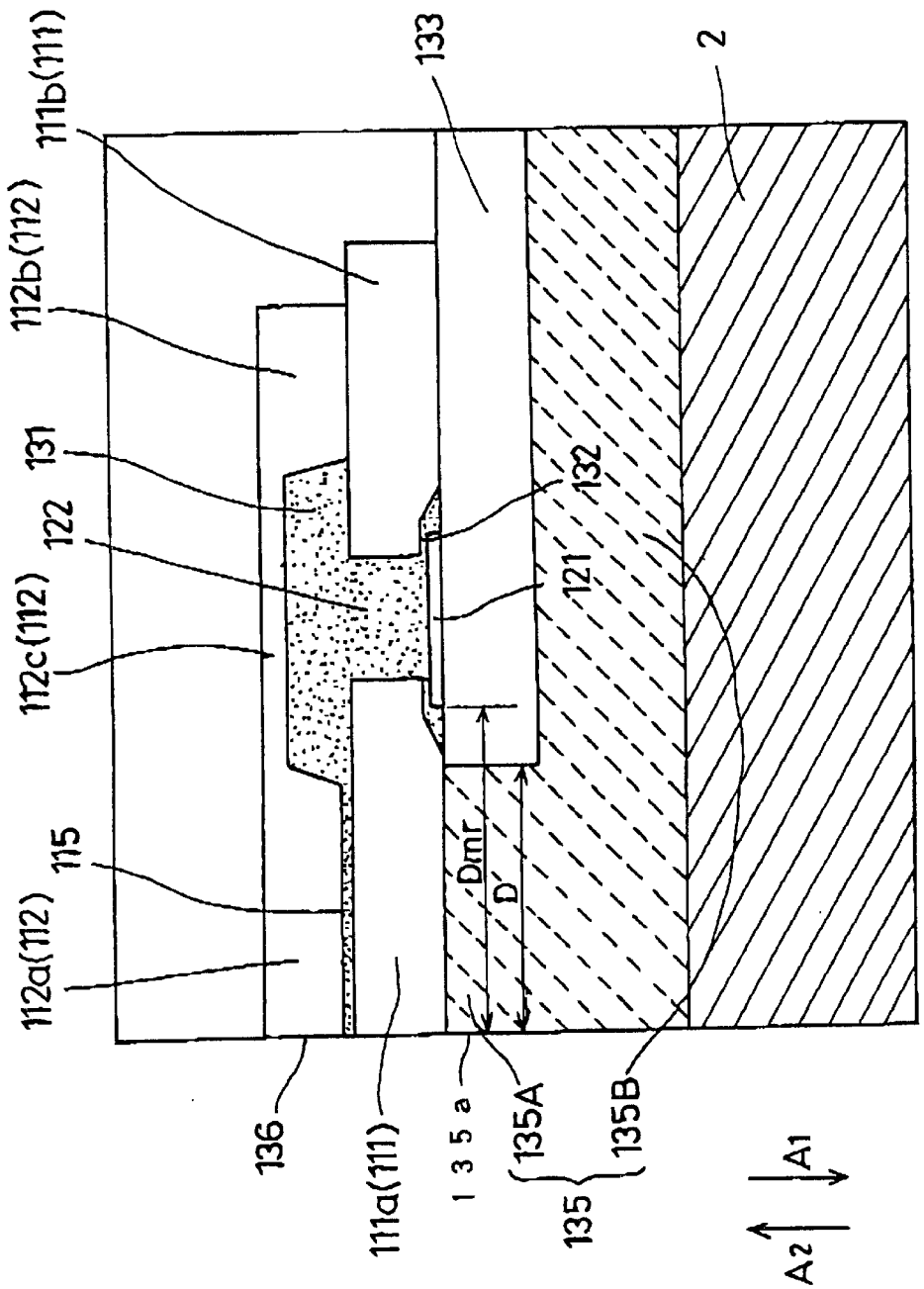
FIG. 9 is a sectional view of a magneto-resistive thin film magnetic head according to a second embodiment of the present invention.

FIG. 9 is a diagram showing an MR head according to the second embodiment of the present invention. In FIG. 5, the same elements as those of FIGS. 5 through 7 are referred to by the same numerals, and a description thereof will be omitted. In the following description, directions indicated by arrows $A_1$ and $A_2$ in FIG. 9 are defined as upward and downward directions, respectively.

According to the above-described MR head shown in FIGS. 5 through 7, the lower auxiliary yoke 134 is provided, with respect to the MR element 121, only on the side of the contact surface 136 with the magnetic tape 1. On the other hand, according to the MR head of this embodiment, a lower auxiliary yoke 135 includes first and second auxiliary yoke portions 135A and 135B, which are integrally formed.

The first auxiliary yoke portion 135A has almost the same structure as the lower auxiliary yoke 134 of the MR head shown in FIGS. 5 through 7. The second auxiliary yoke portion 135B is provided under the nonmagnetic insulating member 133. Like the lower auxiliary yoke 134 of the MR head shown in FIGS. 5 through 7, the lower auxiliary yoke 135 is formed of a ferromagnetic material (Co—Zr based material).

The first auxiliary yoke portion 135A is provided between the front portion 111a of the lower yoke 111 and the substrate 2 so that the upper surface of the first auxiliary yoke portion 135A is magnetically coupled to the front portion 111a of the lower yoke 111. Further, also according to this embodiment, the depth (horizontal dimension) D of the first auxiliary yoke portion 135A is determined so as to satisfy a condition D<Dmr, where Dmr is a distance from a side 135a of the lower auxiliary yoke 135 to one end side of the MR element 121 on the side of the front portion 111a of the lower yoke 111.

According to this structure, the lower auxiliary yoke 135 is prevented from opposing and being magnetically coupled to the rear portion 111b of the lower yoke 111 and the MR element 121, which realizes the same effect as the above-described first embodiment. In other words, also according to this embodiment, a reproduced signal can properly be obtained without distortion of the waveform thereof.

According to the above-described embodiments, each of the lower auxiliary yokes 134 and 135 is formed separately from the front portion 11a of the lower yoke 111 to be magnetically coupled thereto. However, the lower auxiliary yoke 134 or 135 is not necessarily required to be formed separately from the front portion 111a of the lower yoke 111, and the lower auxiliary yoke 134 or 135 and the front portion 11a of the lower yoke 111 can be integrally formed.

According to this structure, cared with the structure in which the lower auxiliary yoke 134 or 135 is formed separately from the front portion 111a of the lower yoke 111, the production process of the MR head can be simplified and the production cost thereof can be lowered by the reduction of the number of components. Further, a pseudo-gap is prevented from being formed in the junction of the lower auxiliary yoke 134 or 135 and the front portion 111a of the lower yoke 111, thus improving the reproduction characteristic of the MR head.

Figure 10:
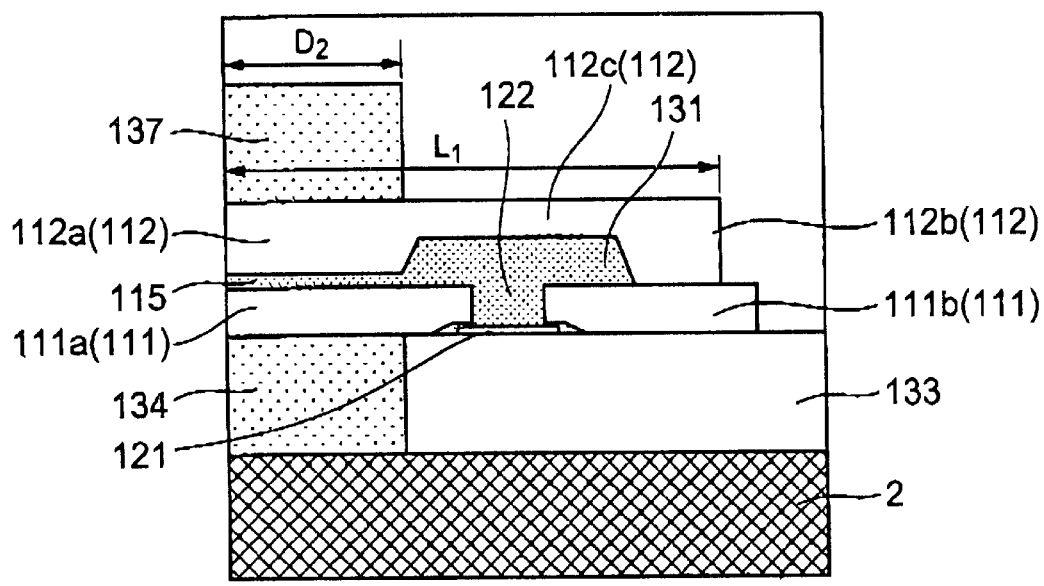
FIG. 10 is a sectional view of a magneto-resistive thin film magnetic head according to a third embodiment of the present invention.
Figure 11:
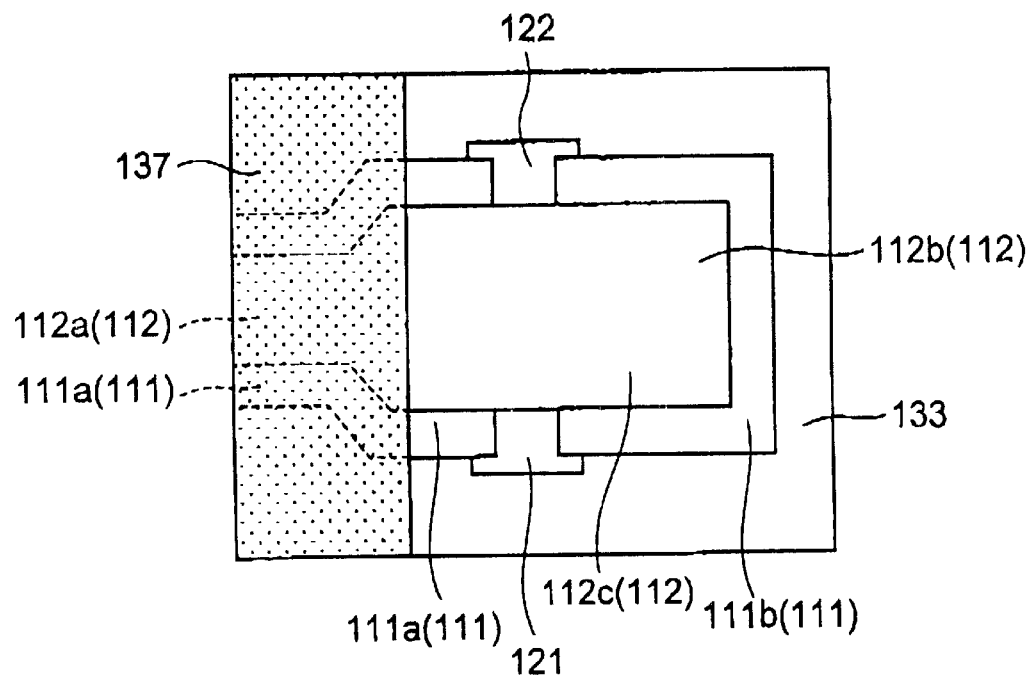
FIG. 11 is a plan view of the magneto-resistive thin film magnetic head of FIG. 10.

A description will now be given, with reference to FIGS. 10 and 11, of a third embodiment of the present invention. FIGS. 10 and 11 show an MR head according to the third embodiment of the present Invention.

According to each of the above-described MR heads shown in FIGS. 5 through 7, only the lower auxiliary yoke 134 is provided under the front portion 111a of the lower yoke 111. However, according to this embodiment, in addition to the lower auxiliary yoke 134, an upper auxiliary yoke 137 is provided on the upper yoke 112. Like the lower auxiliary yoke 134 of the MR head shown in FIGS. 5 through 7, the upper auxiliary yoke 137 is formed of a ferromagnetic material (Co—Zr based material). The depth (horizontal dimension in FIG. 10) $D_2$ of the upper auxiliary yoke 137 is determined so as to satisfy a condition $D_2 \leq L_1$, where $L_1$ is the length of the upper yoke 112.

According to this structure, the leakage magnetic flux from the magnetic tape 1 is prevented from being lead to the MR element 121 via the upper yoke 112. Therefore, the leakage magnetic flux entering the MR head via the front portion 111a of the lower yoke 111 and the upper yoke 112 can be eliminated by the lower and upper auxiliary yokes 134 and 137. Thus, a reproduced signal can properly be obtained without distortion of the waveform thereof.

According to the above-described embodiment, the upper auxiliary yoke 137 is formed separately from the upper yoke 112 to be magnetically coupled thereto. However, the upper auxiliary yoke 137 is not necessarily required to be formed separately from the upper yoke 111, and the upper auxiliary yoke 137 and the upper yoke 112 can be integrally formed.

According to this structure, compared with the structure in which the upper auxiliary yoke 137 is formed separately from the upper yoke 112, the production process of the MR head can be simplified and the production cost thereof can be lowered by the reduction of the number of components. Further, a pseudo-gap is prevented from being formed in the junction of the upper auxiliary yoke 137 and the upper yoke 112, thus Improving the reproduction characteristic of the MR head.

Figure 12:
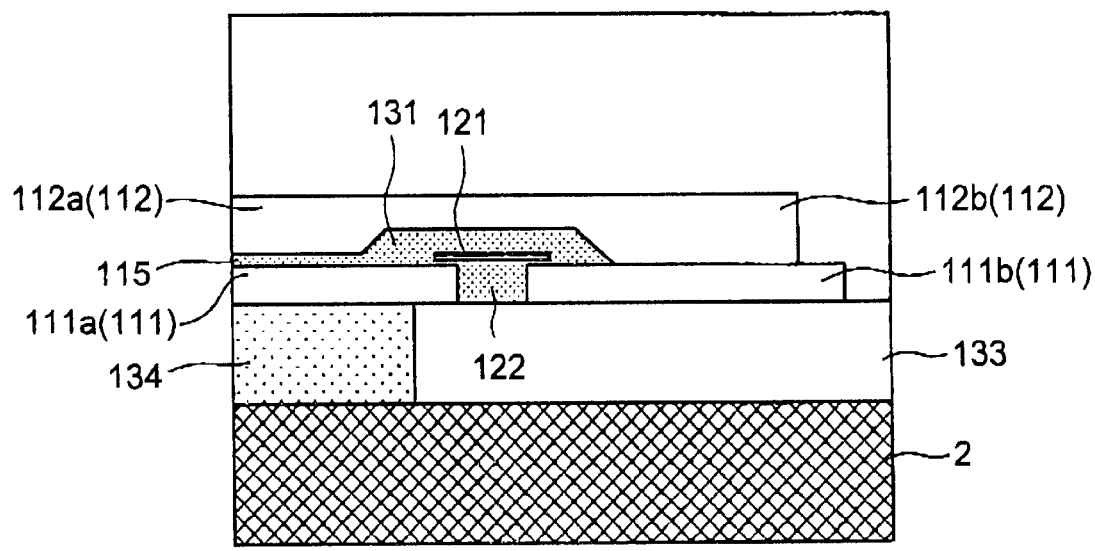
FIG. 12 is a sectional view of a magneto-resistive thin film magnetic head according to a fourth embodiment of the present invention.
Figure 13:
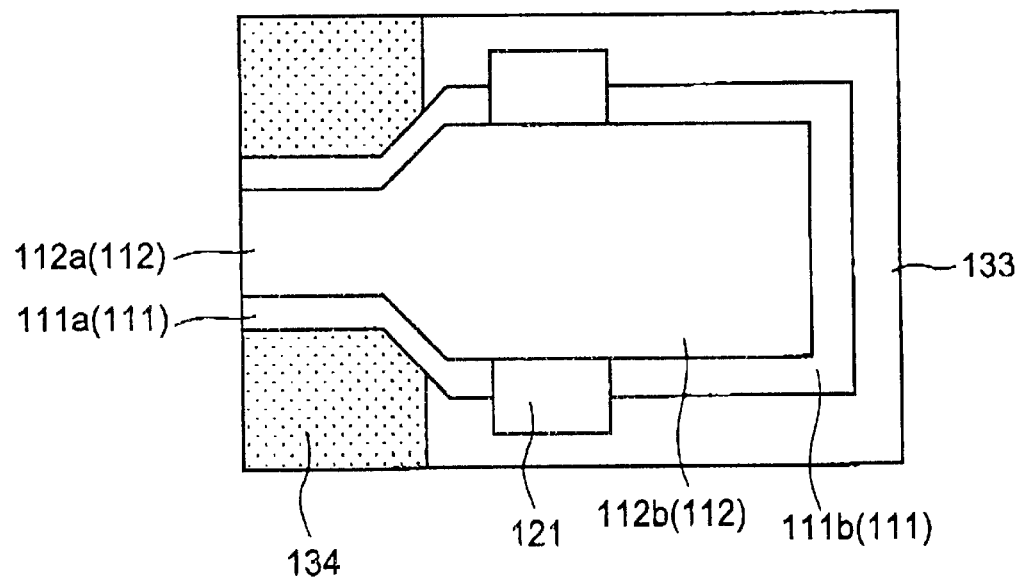
FIG. 13 is a plan view of the magneto-resistive thin film magnetic head of FIG. 12.

Further, although the MR element 121 is provided below the gap 122 formed between the front and rear portions 111a and 111b of the lower yoke 111, the MR element 121 may be provided above the gap 122 formed between the front and rear portions 111a and 111b of the lower yoke 111 as in an MR head, shown in FIGS. 12 and 13, according to a fourth embodiment of the present invention.

Figure 14:
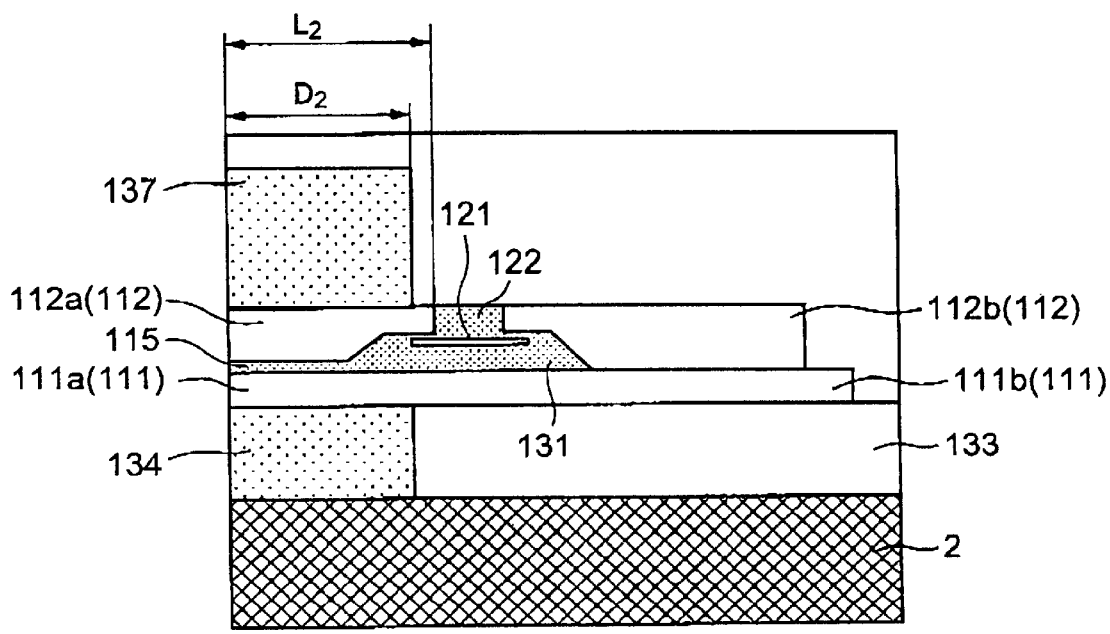
FIG. 14 is a sectional view of a magneto-resistive thin film magnetic head according to a fifth embodiment of the present invention.
Figure 15:
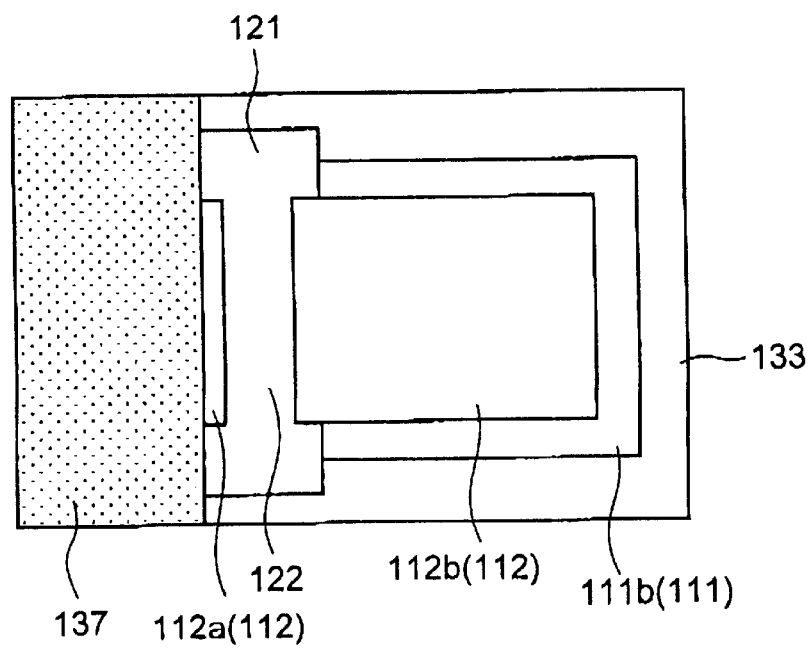
FIG. 15 is a plan view of the magneto-resistive thin film magnetic head of FIG. 14.

A description will now be given, with reference to FIGS. 14 and 15, of a fifth embodiment of the present invention. FIGS. 14 and 15 show an MR head according to the fifth embodiment of the present invention. According to the MR head of this embodiment, as shown in FIGS. 14 and 15, the gap 122 is foamed between the front and rear portions 112a and 112b of the upper yoke 112, and the MR element 121 is provided below the gap 122.

Further, according to the MR head of this embodiment, the lower auxiliary yoke 134 is provided under the lower yoke 111 and the upper auxiliary yoke 137 is provided on the front portion 112a of the upper yoke 112. Like the lower auxiliary yoke 134 of the MR head shown in FIGS. 5 through 7, the lower and upper auxiliary yokes 134 and 137 are formed of a ferromagnetic material (Co—Zr based material). The depth (horizontal dimension in FIG. 14) $D_2$ of the upper auxiliary yoke 137 is determined so as to satisfy a condition $D_2 \leq L_2$, where $L_2$ is the length of the front portion 112a of the upper yoke 112.

According to this structure, the leakage magnetic flux from the magnetic tape 1 is prevented from being lead to the MR element 121 via the lower yoke 111 or the upper yoke 112. Thus, a reproduced signal can properly be obtained without distortion of the waveform thereof.

Also in this embodiment, the lower auxiliary yoke 134 and the lower yoke 111, and the upper auxiliary yoke 137 and the upper yoke 112 can be integrally formed, respectively. According to this structure, compared with the structure in which the lower and upper auxiliary yokes 134 and 137 are formed separately from the lower and upper yokes 111 and 112, respectively, the production process of the MR head can be simplified and the production cost thereof can be lowered by the reduction of the number of components. Further, pseudo-gaps are prevented from being formed in the respective junctions of the lower auxiliary yoke 134 and the lower yoke 111 and of the upper auxiliary yoke 137 and the upper yoke 112, thus improving the reproduction characteristic of the MR head.

Although the lower and upper yokes 111 and 112, the lower auxiliary yoke 134 or 135, and the upper auxiliary yoke 137 are formed of a Co—Zr based material according to the above-described embodiments, the Co—Zr based material can be replaced with a Co based amorphous material and a Co or Fe based microcrystal material.

Further, although the above-described embodiments treat digital data, the same effect as describe above can be obtained with respect to analog data.

Moreover, in the case of providing either of the lower auxiliary yoke 134 or 135, or the upper auxiliary yoke 137, it is effective in reducing noises to provide the lower auxiliary yoke 134 or 135 so that the lower auxiliary yoke 134 or 135 is magnetically coupled to the lower yoke 111 when the MR element 121 is provided on the side of the lower yoke 111, and the upper auxiliary yoke 137 so that the upper auxiliary yoke 137 is magnetically coupled to the upper yoke 112 when the MR element is provided on the side of the upper yoke 112.

The present invention is not limited to the specifically disclosed embodiments, and variations and modifications may be made without departing from the scope of the present invention.

The present application is based on Japanese priority application No. 11-332989 filed on Nov. 24, 1999, the entire contents of which are hereby incorporated by reference.

What is claimed is:

1. The magneto-resistive thin film magnetic head comprising:
   a base;
   a first yoke provided on said base and separated by a gap into first and second portions, the first portion including a side which opposes a magnetic recording medium;
   a magneto-resistive element which is magnetically coupled to the first and second portions of said first yoke and detects a magnetic recording signal;
   a second yoke formed on said first yoke so as to form a reproducing head gap between the first portion of said first yoke and said second yoke; and
   a third yoke provided between the first portion of said first yoke and said base so as to be magnetically coupled to the first portion of said first yoke,
   wherein the reproducing head gap, the first portion of said first yoke, said magneto-resistive element, the second portion of said first yoke, and said second yoke form a circular magnetic circuit, and
   wherein said third yoke has a depth D which satisfies a condition D<Dmr, where Dmr is a distance from the side of the first portion of said first yoke to one end side of said magneto-resistive element, the one end side being on a side of the first portion of said first yoke.

2. The magneto-resistive thin film magnetic head as claimed in claim 1, wherein the first portion of said first yoke and said third yoke are integrally formed.

3. The magneto-resistive thin film magnetic head as claimed in claim 1, wherein a length of said third yoke in a sliding direction of the magnetic recording medium is equal to or more than double a length of a recording wavelength.

4. The magneto-resistive thin film magnetic head as claimed in claim 1, wherein sad magneto-resistive element is provided below the gap.

5. The magneto-resistive thin film magnetic head as claimed in claim 1, wherein said magneto-resistive element is provided above the gap.

6. The magneto-resistive thin film magnetic head as claimed in claim 1, wherein said base includes a substrate and a nonmagnetic insulating member; and said magneto-resistive element is formed on said nonmagnetic insulating layer.

7. The magneto-resistive thin film magnetic head as claimed in claim 6, wherein the substrate and the nonmagnetic insulating member are formed by machining.

8. The magneto-resistive thin film magnetic head as claimed in claim 6, wherein said third yoke has a portion interposed between the substrate and the nonmagnetic insulating member.

9. The magneto-resistive thin film magnetic head comprising:
   a base;
   a first yoke provided on said base and separated by a gap into first and second portions, the first portion including a side which opposes a magnetic recording medium;
   a magneto-resistive element which is magnetically coupled to the first and second portions of said first yoke and detects a magnetic recording signal;
   a second yoke formed on said first yoke so as to form a reproducing head gap between the first portion of said first yoke and said second yoke; and
   a third yoke provided between the first portion of said first yoke and said base so as to be magnetically coupled to the first portion of said first yoke,
   wherein the reproducing head gap, the first portion of said first yoke, said magneto-resistive element, the second portion of said first yoke, and said second yoke form a circular magnetic circuit, and
   wherein a length of said third yoke in a sliding direction of the magnetic recording medium is equal to or more than double a length of a recording wavelength.

10. The magneto-resistive thin film magnetic head comprising:
    a base;
    a first yoke provided on said base;
    a second yoke which is formed on said first yoke and separated by a gap into first and second portions so as to form a reproducing head gap between the first portion and said first yoke, the first portion including a side which opposes a magnetic recording medium;

a magneto-resistive element which is magnetically coupled to the first and second portions of said second yoke and detects a magnetic recording signal; and a third yoke which is provided on the first portion of said second yoke so as to be magnetically coupled thereto, wherein the reproducing head gap, the first portion of said second yoke, said magneto-resistive element, the second portion of said second yoke, and said first yoke form a circular magnetic circuit, and wherein said third yoke has a depth $D_2$ which satisfies a condition $D_2 \leq L_2$, where $L_2$ is a distance from the side of the first portion of said second yoke to one end side of said magneto-resistive element, the one end side being on a side of the first portion of said second yoke.

11. The magneto-resistive thin film magnetic head as claimed in claim 10, wherein the first portion of said second yoke and said third yoke are integrally formed.

12. The magneto-resistive thin film magnetic head as claimed in claim 10, wherein a length of said third yoke in a sliding direction of the magnetic recording medium is equal to or more than double a length of a recording wavelength.

13. The magneto-resistive thin film magnetic head as claimed in claim 10, wherein said magneto-resistive element is provided below the gap.

14. A magneto-resistive thin film magnetic head comprising:

a base;

a first yoke provided on said base and separated by a gap into first and second portions, the first portion including a side which opposes a magnetic recording medium;

a magneto-resistive element which is magnetically coupled to the first and second portions of said first yoke and detects a magnetic recording signal;

a second yoke formed on said first yoke so as to form a reproducing head gap between the first portion of said first yoke and said second yoke; and a third yoke which is provided on said second yoke so as to be magnetically coupled thereto, wherein the reproducing head gap, the first portion of said first yoke, said magneto-resistive element, the second portion of said first yoke, and said second yoke form a circular magnetic circuit.

15. The magneto-resistive thin film magnetic head as claimed in claim 14, wherein said second and third yokes are integrally formed.

16. The magneto-resistive thin film magnetic head as claimed in claim 14, wherein said third yoke has a depth $D_2$ which satisfies a condition $D_2 \leq L_1$, where $L_1$ is a length of said second yoke.

17. The magneto-resistive thin film magnetic head as claimed in claim 16, wherein said second and third yokes are integrally formed.

18. The magneto-resistive thin film magnetic head as claimed in claim 16, wherein a length of said third yoke in a sliding direction of the magnetic recording medium is equal to or more than double a length of a recording wavelength.

19. The magneto-resistive thin film magnetic head as claimed in claim 16, wherein said magneto-resistive element is provided below the gap.

20. The magneto-resistive thin film magnetic head as claimed in claim 16, wherein said magneto-resistive element is provided above the gap.

21. The magneto-resistive thin film magnetic head as claimed in claim 14, wherein a length of said third yoke in a sliding direction of the magnetic recording medium is equal to or more than double a length of a recording wavelength.

22. The magneto-resistive thin film magnetic head as claimed in claim 14, wherein said magneto-resistive element is provided above the gap.

23. The magneto-resistive thin film magnetic head as claimed in claim 14, wherein said magneto-resistive element is provided below the gap.

24. The magneto-resistive thin film magnetic head comprising:

a base;

a first yoke provided on said base;

a second yoke which is formed on said first yoke and separated by a gap into first and second portions so as to form a reproducing head gap between the first portion and said first yoke, the first portion including a side which opposes a magnetic recording medium;

a magneto-resistive element which is magnetically coupled to the first and second portions of said second yoke and detects a magnetic recording signal; and a third yoke which is provided on the first portion of said second yoke so as to be magnetically coupled thereto, wherein the reproducing head gap, the first portion of said second yoke, said magneto-resistive element, the second portion of said second yoke, and said first yoke form a circular magnetic circuit, and wherein a length of said third yoke in a sliding direction of the magnetic recording medium is equal to or more than double a length of a recording wavelength.

* * * * *